F. Hazard.
Wire Rope Mach.
Nº 56,220. Patented Jul. 10, 1866.
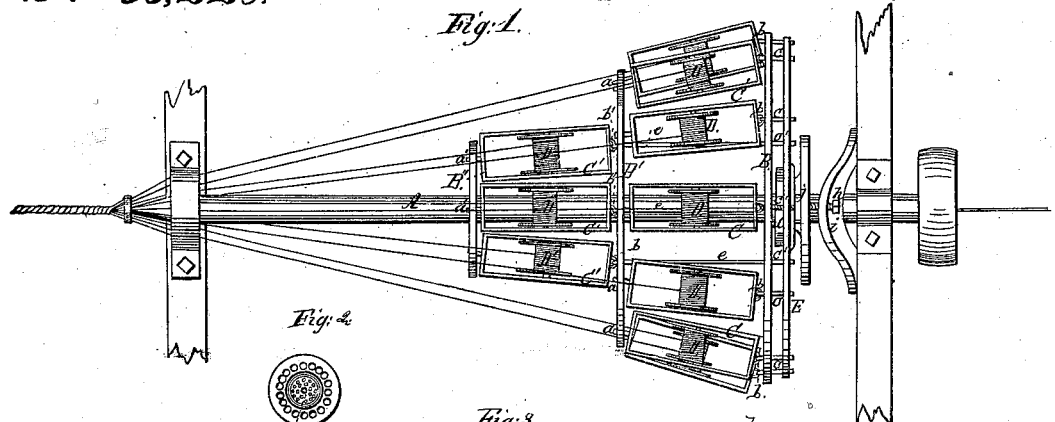
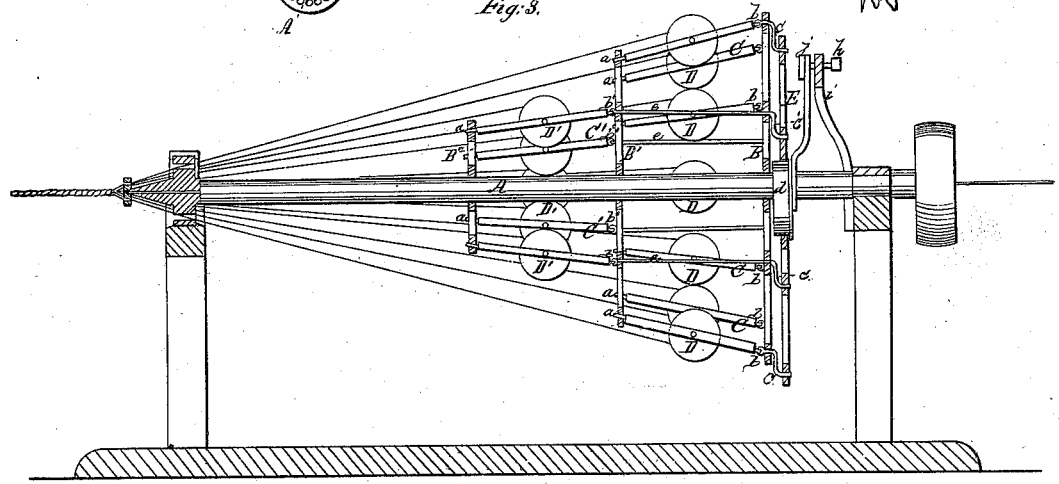
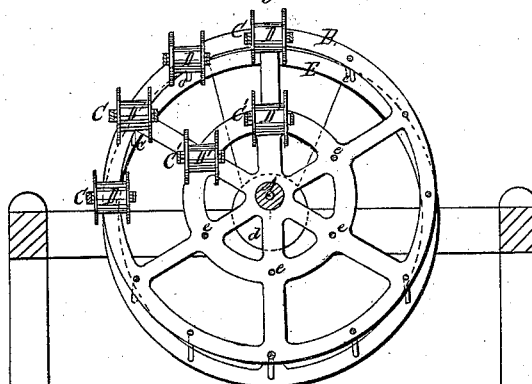

UNITED STATES PATENT OFFICE.

F. HAZARD, OF MAUCH CHUNK, PENNSYLVANIA.

IMPROVEMENT IN MACHINERY FOR WEAVING WIRE ROPE.

Specification forming part of Letters Patent No. 56,220, dated July 10, 1866.

*To all whom it may concern:*

Be it known that I, F. HAZARD, of Mauch Chunk, in the county of Carbon and State of Pennsylvania, have invented a new and Improved Machine for Making Wire Rope; and I do hereby declare that the following is a full, clear, and exact description thereof, which will enable others skilled in the art to make and use the same, reference being had to the accompanying drawings, forming a part of this specification, in which—

Figure 1 represents a plan or top view of this invention. Fig. 2 is an end view of the combination spout. Fig. 3 is a side elevation of the machine, partly in section. Fig. 4 is a transverse section of the same.

Similar letters of reference indicate like parts.

This invention relates to a machine for making wire ropes in which two sets of spools are used, which revolve in suitable frames having their bearings in rims or flanges of different diameters, said frames being connected to cranks which are secured in eccentric disks in such a manner that by revolving the shaft on which said rims or flanges are mounted the requisite sun-and-planet motion is imparted to the spool-frames, and the wire contained on the spools is twisted in the desired manner. The connection between the spool-frames and the cranks is effected by universal joints, so that said frames can always be brought in the proper position to put in and take out the spools with ease and convenience.

A represents a hollow shaft, to which a revolving motion is imparted by a pulley mounted on its end, or by any other suitable means. On this shaft are mounted three disks or flanges, B B' B'', of gradually-decreasing diameters, and between these flanges are hung a series of frames, C C', which form the bearings for the axles of the spools D D'. The spool-frames C', which are hung between the flanges B and B', are provided with gudgeons $a$ at one end, and their opposite ends connect by suitable hinge-joints or universal joints $b$ with crank $c$.

The gudgeons $a$ have their bearings in suitable sockets in the rim B', and the cranks $c$ turn freely in appropriate sockets in the rim B, their wrists being made to catch in holes in a ring, E. The hub of this ring is bored out to fit on an eccentric disk, $d$, which is placed loosely on the main shaft A, and which is prevented from turning round with the ring E by a set-screw, $h$, which is tapped in a standard, $i$, and catches in a hole made in a segmental arm, $j$, which extends from the eccentric disk.

The spool-frames C' are hung between the flanges B' and B'', and they are provided at one end with gudgeons $a'$ similar to the gudgeons of the spool-frames C, and their opposite ends connect by hinge-joints or universal joints $b'$ with rods $e$, which have their bearings in secondary flanges B* B'*, which may be made solid with or otherwise connected to the flanges B B'. The outer ends of the rods $e$ form cranks $c'$, the wrists of which catch in suitable sockets in the hub of the ring E.

The threads or wires from the several spools in the frames C C' pass out through the holes $f$ in a collar, $g$, mounted near the end of the driving-shaft A, and having two distinct sets of spool-frames, a large number of spools can be used simultaneously without danger of getting the several wires entangled with each other, and at the same time each spool-frame can easily be reached.

If the set-screw $h$, which retains the segmental arm $j$ of the eccentric, is turned back so as to release said arm, and the desired position can be given to the cranks $c$ $c'$ and to the spool-frames C C', said frames can be at any minute brought in the most convenient position for the purpose of introducing or removing the spools.

This machine is simple in its construction and not liable to get out of order. It takes comparatively little power to operate the same, and affords the opportunity to use a a large number of spools.

What I claim as new, and desire to secure by Letters Patent, is—

1. The flanges B B' B'', in combination with the axle A, spool-frames C C', cranks $c$ $c'$, and ring E, constructed and operating substantially as and for the purpose described.

2. The joints $b$ $b'$, in combination with the flanges B B', frames C C', cranks $c$ $c'$, and ring E, constructed and operating substantially as and for the purpose set forth.

3. The arm $j$ and set-screw $h$, in combination with the eccentric disk $d$, cranks $c$ $c'$, frames C C', and shaft A, constructed and operating substantially as and for the purpose described.

F. HAZARD.

Witnesses:
SAMUEL LINE,
W. E. FRISBIE.